(12) United States Patent
Yu (10) Patent No.: US 11,797,174 B2
(45) Date of Patent: Oct. 24, 2023

(54) NUMERICAL VALUE SELECTING METHOD AND DEVICE, TERMINAL EQUIPMENT, AND STORAGE MEDIUM (71) Applicant: BEIJING XIAOMI MOBILE SOFTWARE CO., LTD., Beijing (CN)

(72) Inventor: Peiyun Yu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 120 days.

(21) Appl. No.: 17/207,505

(22) Filed: Mar. 19, 2021

(65) Prior Publication Data
US 2021/0382614 A1    Dec. 9, 2021

(30) Foreign Application Priority Data

Jun. 3, 2020   (CN) .......................... 202010496094.1

(51) Int. Cl.
*G06F 3/04883*   (2022.01)
*G06F 3/01*      (2006.01)
*G06T 11/20*     (2006.01)

(52) U.S. Cl.
CPC .......... *G06F 3/04883* (2013.01); *G06F 3/017* (2013.01); *G06T 11/203* (2013.01)

(58) Field of Classification Search
CPC .... G06F 3/04883; G06F 3/017; G06F 3/0488; G06F 3/04847; G06T 11/203
See application file for complete search history.

(56) References Cited

U.S. PATENT DOCUMENTS 9,922,112 B2 *   3/2018   Koshimae ............. G06F 16/285
10,649,573 B2 *  5/2020   Kihara .................. G06F 3/0412
(Continued)

FOREIGN PATENT DOCUMENTS

CN    101674375 A    3/2010
CN    103076985 A    5/2013
(Continued)

OTHER PUBLICATIONS

First Office Action issued to Chinese Application No. 202010496094.1 dated Apr. 6, 2021 with English translation, (14p).
(Continued)

*Primary Examiner* — Matthew Ell
*Assistant Examiner* — Kenny Nguyen
(74) *Attorney, Agent, or Firm* — Arch & Lake LLP (57) ABSTRACT

The numerical value selecting method includes that: an operational gesture input by a user is acquired; it is identified whether the operational gesture is a first operational gesture or a second operational gesture preset; when the operational gesture is the first operational gesture, a scale unit of the numerical scale is increased; and when the operational gesture is the second operational gesture, the scale unit of the numerical scale is decreased. The first operational gesture is one of a movement of two fingers moving toward each other and a movement of the two fingers moving away from each other. The second operational gesture is the other of the movement of the two fingers moving toward each other and the movement of the two fingers moving away from each other.

10 Claims, 9 Drawing Sheets

(56) References Cited

U.S. PATENT DOCUMENTS

| | | | |
|---|---|---|---|
| 2013/0050269 A1* | 2/2013 | Arrasvuori | G06F 3/0488 345/661 |
| 2013/0145327 A1* | 6/2013 | Rinearson | G06F 16/957 715/863 |
| 2014/0365934 A1* | 12/2014 | Moore | G01C 21/3664 715/769 |
| 2016/0004423 A1 | 1/2016 | Springer et al. | |
| 2016/0378330 A1* | 12/2016 | Hisada | G06F 3/04847 715/863 |
| 2017/0010792 A1* | 1/2017 | Stewart | G06F 3/0485 |
| 2017/0168857 A1* | 6/2017 | Liu | G06F 3/04886 |
| 2017/0263034 A1 | 9/2017 | Kenoff et al. | |
| 2017/0316805 A1* | 11/2017 | Wang | H04N 21/47217 |
| 2018/0239509 A1* | 8/2018 | Hinckley | G06F 3/0418 |
| 2019/0084319 A1 | 3/2019 | Yoshida et al. | |
| 2019/0138194 A1* | 5/2019 | Ryan | G06F 16/958 |
| 2019/0243598 A1* | 8/2019 | Kim | G06F 1/1616 |
| 2020/0241948 A1* | 7/2020 | Zhang | G06F 11/0742 |
| 2020/0293168 A1* | 9/2020 | Kim | G06F 3/04883 |
| 2020/0379631 A1* | 12/2020 | Karlsson | G06F 3/04883 |

FOREIGN PATENT DOCUMENTS

| | | |
|---|---|---|
| CN | 103176632 A | 6/2013 |
| CN | 109511017 A | 3/2019 |
| CN | 110399199 A | 10/2019 |
| EP | 2951665 A1 | 12/2015 |

OTHER PUBLICATIONS

Supplementary European Search Report in the European application No. EP211651120, dated Sep. 22, 2021.

* cited by examiner

NUMERICAL VALUE SELECTING METHOD AND DEVICE, TERMINAL EQUIPMENT, AND STORAGE MEDIUM

CROSS-REFERENCE TO RELATED APPLICATIONS

This application is based on, and claims priority to, Chinese Application No. 202010496094.1 filed on Jun. 3, 2020. The content of the Chinese Application is hereby incorporated by reference in its entirety for all purposes.

BACKGROUND

With development of diversified functions on a mobile phone, there are an increasing number of scenes on the mobile phone where a user has to select a numerical value. That is, there are an increasing number of numerical value selecting interfaces on the mobile phone where a numerical value has to be selected. For example, a numerical value selecting interface for selecting a numerical value such as an exercise distance, an exercise step number, an exercise duration, etc., may exist in an exercise application (APP) of a mobile phone, and a user is to select an exercise parameter such as a step number, a kilometer number, a duration, etc., on a corresponding numerical value selecting interface to record an amount of exercise.

As numerical value selecting ranges on different selecting interfaces may differ greatly, there may be a numerical value selecting interface with a great numerical value selecting range and a small numerical unit. For example, in a numerical value selecting interface for selecting an exercise distance, the numerical unit is m, and the numerical value selecting range may be up to tens of kilometers. However, in such a numerical value selecting interface, when selecting a numerical value over a great span, a user has to perform long-distance slide for multiple times, which not only consumes time and effort, but also reduces user experience.

SUMMARY

The present disclosure generally relates to field of mobile terminals, and specifically to field of numerical value selector technology.

A numerical value selecting method and device, terminal equipment, and a storage medium are provided.

According to an aspect, the present disclosure provides a numerical value selecting method, for selecting a numerical value on a numerical value selecting interface having a numerical scale. The method includes:

acquiring an operational gesture input by a user;

identifying whether the operational gesture is a first operational gesture or a second operational gesture preset; in response to the operational gesture being the first operational gesture, increasing a scale unit of the numerical scale; and in response to the operational gesture being the second operational gesture, decreasing the scale unit of the numerical scale. The first operational gesture is one of a movement of two fingers moving toward each other and a movement of the two fingers moving away from each other. The second operational gesture is the other of the movement of the two fingers moving toward each other and the movement of the two fingers moving away from each other.

According to an aspect, the present disclosure provides terminal equipment, including a memory, a processor, and a computer program stored on the memory and executable on the processor. When executing the program, the processor implements the numerical value selecting method.

According to an aspect, the present disclosure provides a computer-readable storage medium, having stored thereon a computer program which, when executed by a processor, implements the numerical value selecting method.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate examples consistent with the disclosure and, together with the description, serve to explain the principles of the disclosure.

By reading elaboration of non-limiting examples with reference to following drawings, other characteristics, purposes and advantages of the present disclosure will become more clear.

DETAILED DESCRIPTION

Reference will now be made in detail to examples, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the disclosure. Instead, they are merely examples of devices and methods consistent with aspects related to the disclosure as recited in the appended claims. The exemplary implementation modes may take on multiple forms, and should not be taken as being limited to examples illustrated herein. Instead, by providing such implementation modes, examples herein may become more comprehensive and complete, and comprehensive concept of the exemplary implementation modes may be delivered to those skilled in the art. Implementations set forth in the following examples do not represent all implementations in accordance with the subject disclosure. Rather, they are merely examples of the apparatus and method in accordance with certain aspects herein as recited in the accompanying claims.

Note that although a term such as first, second, third may be adopted in an example herein to describe various kinds of information, such information should not be limited to such a term. Such a term is merely for distinguishing information of the same type. For example, without departing from the scope of the examples herein, the first information may also be referred to as the second information. Similarly, the second information may also be referred to as the first information. Depending on the context, a "if" as used herein may be interpreted as "when" or "while" or "in response to determining that".

In addition, described characteristics, structures or features may be combined in one or more implementation modes in any proper manner. In the following descriptions, many details are provided to allow a full understanding of examples herein. However, those skilled in the art will know that the technical solutions of examples herein may be carried out without one or more of the details; alternatively, another method, component, device, option, etc., may be adopted. Under other conditions, no detail of a known structure, method, device, implementation, material or operation may be shown or described to avoid obscuring aspects of examples herein.

A block diagram shown in the accompanying drawings may be a functional entity which may not necessarily correspond to a physically or logically independent entity. Such a functional entity may be implemented in form of software, in one or more hardware modules or integrated circuits, or in different networks and/or processor devices and/or microcontroller devices.

A terminal may sometimes be referred to as a smart terminal. The terminal may be a mobile terminal. The terminal may also be referred to as User Equipment (UE), a Mobile Station (MS), etc. A terminal may be equipment or a chip provided therein that provides a user with a voice and/or data connection, such as handheld equipment, onboard equipment, etc., with a wireless connection function. Examples of a terminal may include a mobile phone, a tablet computer, a notebook computer, a palm computer, a Mobile Internet Device (MID), wearable equipment, Virtual Reality (VR) equipment, Augmented Reality (AR) equipment, a wireless terminal in industrial control, a wireless terminal in unmanned drive, a wireless terminal in remote surgery, a wireless terminal in a smart grid, a wireless terminal in transportation safety, a wireless terminal in smart city, a wireless terminal in smart home, etc.

The present disclosure is further elaborated below with reference to the drawings and examples. Understandably, a specific example described here is merely for explaining relevant disclosure, rather than limiting the disclosure. In addition, it should be noted that, for ease of description, only parts relevant to the disclosure are shown in the drawings.

It should be noted that examples of the present disclosure and features thereof may be combined with each other as long as no conflict results from the combination. The present disclosure is further elaborated below with reference to the drawings and examples.

It should be understood that a numerical value selecting interface is an interface displayed in a mobile terminal. The numerical value selecting interface is provided with a scale and a pointer used together with the scale. The pointer is configured to indicate a numerical value selected at present. The numerical value selecting interface may be applied to various selection scenes where a numerical value is to be selected. A type of a numerical value in the numerical value selecting interface may exemplarily be, but not limited to, a length, a duration, a volume, an amount, etc. The mobile terminal may exemplarily be, but not limited to, a mobile phone, a computer, a tablet computer, etc.

Figure 1:
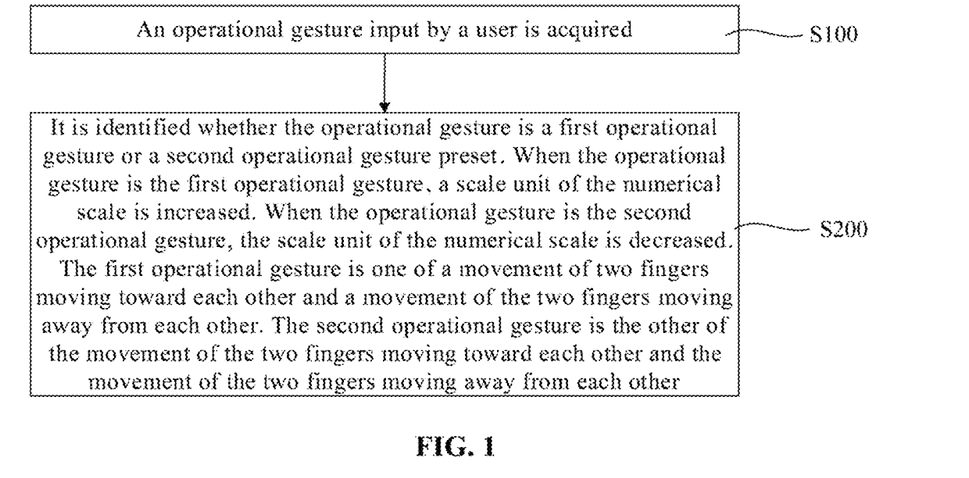
FIG. 1 is a flowchart of a numerical value selecting method according to an example of the present disclosure.

Referring to FIG. 1, the present disclosure provides a numerical value selecting method for selecting a numerical value on a numerical value selecting interface having a numerical scale. The method includes steps as follows.

In S100, an operational gesture input by a user is acquired.

In S200, it is identified whether the operational gesture is a first operational gesture or a second operational gesture preset. When the operational gesture is the first operational gesture, a scale unit of the numerical scale is increased. When the operational gesture is the second operational gesture, the scale unit of the numerical scale is decreased. The first operational gesture is one of a movement of two fingers moving toward each other and a movement of the two fingers moving away from each other. The second operational gesture is the other of the movement of the two fingers moving toward each other and the movement of the two fingers moving away from each other.

In the example, an operational gesture input by a user is acquired; it is identified whether the operational gesture is a first operational gesture or a second operational gesture preset; when the operational gesture is the first operational gesture, a scale unit of the numerical scale is increased; and when the operational gesture is the second operational gesture, the scale unit of the numerical scale is decreased. The first operational gesture is one of a movement of two fingers moving toward each other and a movement of the two fingers moving away from each other. The second operational gesture is the other of the movement of the two fingers moving toward each other and the movement of the two fingers moving away from each other. With such an arrangement, the user may scale the scale value of the scale through a movement of two fingers moving toward, or away from, each other, scaling a numerical unit, such that the user can quickly and accurately select a numerical value over a great span, improving efficiency in selecting a numerical value by the user, thereby improving user experience.

Increase of the scale unit refers to that the scale unit increases, such as from 1 meter (m) to 10 m, etc. Decrease of the scale unit refers to that the scale unit decreases, such as from 10 m to 1 m, etc. The first operational gesture may preferably be a movement of two fingers moving toward each other, i.e., a pinch movement with two fingers. The second operational gesture may preferably be a movement of two fingers moving away from each other, i.e., an expanding movement with two fingers. With such an arrangement, gestures for increasing and decreasing the scale unit meet habits of most users, providing users with a more humane service.

The operational gesture input by the user may be acquired via a touch screen of the mobile terminal, a photographing device of the mobile terminal, or a radar device of the mobile terminal. Taking the touch screen as an example, a parameter such as a slide track, slide time, etc., of a finger of the user on the touch screen is detected, to identify the operational gesture input by the user. Taking the photographing device or the radar device of the mobile terminal as an example, a parameter such as a movement track, movement time, etc., of a finger of the user moving in a photographing space of the photographing device or in a detection space of the radar device is detected, to identify the operational gesture input by the user. The photographing space of the photographing device or the detection space of the radar device may be located above the screen of the mobile phone.

Each time the user inputs an operational gesture, the operational gesture input by the user may be identified to determine whether the operational gesture is the first operational gesture or the second operational gesture. Each time the operational gesture input by the user is identified as the first operational gesture, the scale unit is increased once. Each time the operational gesture input by the user is identified as the second operational gesture, the scale unit is decreased once. With such an arrangement, the user may scale the scale unit for multiple times, facilitating flexible and quick selection of a numerical value by the user as needed. For example, a present scale unit is 1 m, a starting value is 0, and a target numerical value of the user is 3000 m. The user may input the first operational gesture once or for multiple times to increase the scale unit to 100 m or 1000 m. At this time, the user may select the target numerical value through a short slide distance. As another example, the present scale unit is 1 m, the starting value is 0, and the target numerical value of the user is 3010 m. The user may input the first operational gesture for multiple times to increase the scale unit to 100 m, align the pointer between 3000 m and 3100 m, and then input the second operational gesture once or for multiple times to decrease the scale unit to 10 m. At this time, the user may select the target numerical value with a short slide distance.

In some examples of the present disclosure, the numerical value selecting method may further include a step as follows.

Each time the first operational gesture is identified, a first amount of movement between the two fingers is acquired, and an increase ratio for increasing the scale unit is controlled according to an increase rule preset and the first amount of movement.

Additionally or alternatively, each time the second operational gesture is identified, a second amount of movement between the two fingers is acquired, and a decrease ratio for decreasing the scale unit is controlled according to a decrease rule preset and the second amount of movement.

In the example, each time the operational gesture input by the user is identified as the first operational gesture, a first amount of movement between the two fingers is acquired, and an increase ratio for increasing the scale unit is controlled according to an increase rule preset and the first amount of movement. Additionally or alternatively, each time the operational gesture input by the user is identified as the second operational gesture, a second amount of movement between the two fingers is acquired, and a decrease ratio for decreasing the scale unit is controlled according to a decrease rule preset and the second amount of movement. With such an arrangement, the user can control a scaling ratio for scaling the scale unit according to the amount of movement of the two fingers moving toward or away from each other, allowing the user to quickly adjust the scaling ratio for scaling the scale unit to a scaling ratio as needed with just a few operations, improving efficiency in selecting a numerical value by the user.

Further, the increase rule may be a positive correlation between the first amount of movement and the increase ratio. Additionally or alternatively, the decrease rule may be a positive correlation between the second amount of movement and the decrease ratio.

The positive correlation between the first amount of movement and the increase ratio refers to that the increase ratio increases when the first amount of movement increases, and that the increase ratio decreases when the first amount of movement decreases. Likewise, the positive correlation between the second amount of movement and the decrease ratio refers to that the decrease ratio increases when the second amount of movement increases, and that the decrease ratio decreases when the second amount of movement decreases. With such an arrangement, the mode of adjusting the scaling ratio can meet habits of most users, providing users with a more humane service.

Further, there may be multiple different increase ratios for increasing the scale unit. For the first amount of movement, there may be multiple first distance intervals in one-to-one correspondence with the multiple increase ratios. When the first amount of movement reaches a first distance interval, the scale unit is increased according to the increase ratio corresponding to the first distance interval. Likewise, there may be multiple different decrease ratios for decreasing the scale unit. For the second amount of movement, there may be multiple second distance intervals in one-to-one correspondence with the multiple decrease ratios. When the second amount of movement reaches a second distance interval, the scale unit is decreased according to the decrease ratio corresponding to the second distance interval.

A second acquisition unit may acquire the first amount of movement and the second amount of movement through a touch screen. Specifically, when two fingers of the user move toward or away from each other on the touch screen, coordinates of a starting point and coordinates of an ending point of each finger on the touch screen are detected through the touch screen, and the first amount of movement and the second amount of movement may be acquired through subtraction between the coordinates of the starting point and the coordinates of the ending point.

In some examples of the present disclosure, an increase ratio for each increase of the scale unit is identical, and/or a decrease ratio for each decrease of the scale unit is identical.

With such an arrangement, the user may select a required numerical value more directly and accurately. The increase ratio and the decrease ratio for each time may be determined according to the type of the numerical value. Taking the distance as an example, the increase ratio and the decrease ratio for each time may be 2 times, 5 times, 10 times, 100 times, etc. The increase ratio for each time may be the same as or different from the decrease ratio for each time.

Of course, an increase ratio for each increase of the scale unit may differ, and/or a decrease ratio for each decrease of the scale unit may differ. For example, the difference between increase ratios for any two consecutive increases of the scale unit is the same; and the difference between decrease ratios for any two consecutive decreases of the scale unit is the same.

In some examples of the present disclosure, the method may further include steps as follows.

Each time the first operational gesture is identified, it may be determined whether a present scale unit reaches an increase threshold preset. When the present scale unit reaches the increase threshold, the present scale unit may be kept unchanged. Otherwise, when the present scale unit does not reach the increase threshold, the present scale unit may be increased.

Additionally or alternatively, each time the second operational gesture is identified, it may be determined whether a present scale unit reaches a decrease threshold preset. When the present scale unit reaches the decrease threshold, the present scale unit may be kept unchanged. Otherwise, when the present scale unit does not reach the decrease threshold, the present scale unit may be decreased.

In the example, the scale unit may have a minimum value and a maximum value. That is, the scale unit has the decrease threshold and the increase threshold, and the scale unit is no longer increased or decreased when reaching the increase threshold or the decrease threshold. Such an arrangement not only reduces difficulty in design of the numerical value selecting device, but also avoids unlimited scaling of the scale unit caused by incorrect operation by the user.

The decrease threshold and the increase threshold may be set reasonably according to a selection scene. Taking a selection scene of selecting an exercise distance as an example, the decrease threshold may be 0.1 m or 1 m, and the increase threshold may be 100 m or 1000 m.

In some examples of the present disclosure, the method may further include steps as follows.

It may be determined whether the numerical value selecting interface is accessed for a first time. When the numerical value selecting interface is accessed for the first time, a first operation prompt may be displayed on the numerical value selecting interface. The first operation prompt may be configured to notify the user that the scale unit is to be increased through the first operational gesture and/or decreased through the second operational gesture.

In the example, it may be determined whether the numerical value selecting interface is accessed for a first time. If the numerical value selecting interface is accessed for the first time, it means that the numerical value selecting interface is opened by the user for the first time. A first operation prompt may pop up on the numerical value selecting interface, notifying the user that the scale unit is to be increased through the first operational gesture and/or decreased through the second operational gesture. The first operation prompt may be a text reminder, such as: perform pinch with two fingers to compress the scale, or perform an expanding movement with two fingers to zoom in on the scale. The first operation prompt may further be a graphic reminder such as an arrow, such as two arrows pointing to opposite directions.

A numerical value selecting interface has a unique address. A total number of accesses to the numerical value selecting interface may be acquired by acquiring a total number of accesses to the address. Then, it may be determined whether the numerical value selecting interface is accessed for the first time by determining whether the total number of accesses to the numerical value selecting interface is 1.

In some examples of the present disclosure, the numerical value selecting interface further includes a pointer used together with the numerical scale, and the method may further include steps as follows.

It may be identified whether the operational gesture is a third operational gesture preset. The third operational gesture may include a movement of a finger in one direction.

When the operational gesture is the third operational gesture, the scale or the pointer may be controlled to move along the one direction in which the finger moves in the third operational gesture.

In the example, it is identified whether the operational gesture input by the user is a third operational gesture preset. When the operational gesture input by the user is the third operational gesture, the scale or the pointer may be controlled to move along the one direction in which the finger moves in the third operational gesture, to allow the user to select a numerical value.

Movement time of moving the scale or the pointer may be the same as movement time of the third operational gesture, or greater than movement time of the third operational gesture. For example, the movement time of the scale or the pointer is a sum of the movement time of the third operational gesture and a preset inertial run time. The inertial run time may be set as needed, and may exemplarily be, but not limited to, 1 s, etc.

It should be understood that the first operational gesture and the second operational gesture are configured to scale the scale unit to quickly find the area where a numerical value to be selected is located. Then, the user selects the numerical value by inputting the third operational gesture.

Further, the method may also include steps as follows.

A number of consecutive occurrences of the third operational gesture may be acquired.

It may be determined whether the number of consecutive occurrences of the third operational gesture exceeds a number threshold preset. When the number of consecutive occurrences of the third operational gesture exceeds the number threshold, a second operation prompt may be displayed on the numerical value selecting interface. The second operation prompt may be configured to notify the user that the scale unit is to be increased through the first operational gesture and/or decreased through the second operational gesture.

A number of consecutive occurrences of the third operational gesture may be acquired. Then, it may be determined whether the number of consecutive occurrences of the third operational gesture exceeds a number threshold preset. When the number of consecutive occurrences of the third operational gesture exceeds the number threshold, it means that it is very likely that the user is constantly moving the scale and the pointer to select a required numerical value. At this time, a second operation prompt may pop up on the numerical value selecting interface to notify the user that the scale unit is to be increased through the first operational gesture and/or decreased through the second operational gesture. Content of the second operation prompt may be the same as content of the first operation prompt, and will not be repeated herein. The number threshold may exemplarily be, but not limited to, 3 times, etc.

It may be determined whether an interval between any two consecutive third operational gestures of N third operational gestures input by the user is not greater than a preset time threshold or a preset inertial run time. If the interval is not greater than the preset time threshold or the preset inertial run time, a number of consecutive occurrences of the third operational gesture is acquired as N times. The time threshold may exemplarily be, but not limited to, 1 s, etc.

Figure 2:
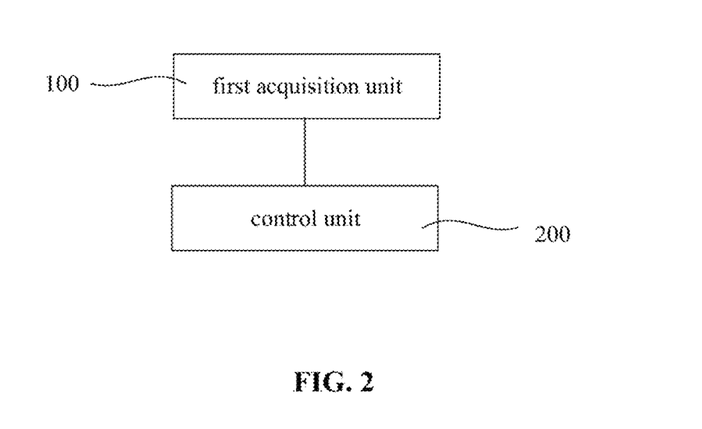
FIG. 2 is a block diagram of a structure of a numerical value selecting device according to an example of the present disclosure.

Referring to FIG. 2, the present disclosure provides a numerical value selecting device for selecting a numerical value on a numerical value selecting interface having a numerical scale. The device includes:

a first acquisition unit 100, configured to acquire an operational gesture input by a user; and a control unit 200, the control unit 200 being connected to the first acquisition unit 100, and configured to identify whether the operational gesture is a first operational gesture or a second operational gesture preset; in response to the operational gesture being the first operational gesture, increase a scale unit of the numerical scale; and in response to the operational gesture being the second operational gesture, decrease the scale unit of the numerical scale. The first operational gesture is one of a movement of two fingers moving toward each other and a movement of the two fingers moving away from each other. The second operational gesture is the other of the movement of the two fingers moving toward each other and the movement of the two fingers moving away from each other.

Further, an increase ratio for each increase of the scale unit is identical, and/or a decrease ratio for each decrease of the scale unit is identical.

Further, the numerical value selecting device may also include:

a second acquisition unit configured to, in response to identifying the first operational gesture, acquire a first amount of movement between the two fingers; and/or in response to identifying the second operational gesture, acquire a second amount of movement between the two fingers.

The control unit 200 may be connected to the second acquisition unit, and configured to control an increase ratio for increasing the scale unit according to an increase rule preset and the first amount of movement, and/or control a decrease ratio for decreasing the scale unit according to a decrease rule preset and the second amount of movement.

Further, the increase rule may be a positive correlation between the first amount of movement and the increase ratio, and/or the decrease rule may be a positive correlation between the second amount of movement and the decrease ratio. Further, the control unit 200 may also be configured to, in response to identifying the first operational gesture, determine whether a present scale unit reaches an increase threshold preset; in response to the present scale unit reaching the increase threshold, keep the present scale unit unchanged; otherwise, in response to the present scale unit not reaching the increase threshold, increase the present scale unit; and/or in response to identifying the second operational gesture, determine whether a present scale unit reaches a decrease threshold preset; in response to the present scale unit reaching the decrease threshold, keep the present scale unit unchanged; otherwise, in response to the present scale unit not reaching the decrease threshold, decrease the present scale unit.

Further, the control unit 200 may also be configured to determine whether the numerical value selecting interface is accessed for a first time; in response to the numerical value selecting interface being accessed for the first time, display a first operation prompt on the numerical value selecting interface, the first operation prompt being configured to notify the user that the scale unit is to be increased through the first operational gesture and/or decreased through the second operational gesture.

Further, the control unit 200 may also be configured to identify whether the operational gesture is a third operational gesture preset; and in response to the operational gesture being the third operational gesture, control the scale or the pointer to move along the direction in which the finger moves in the third operational gesture. The third operational gesture may include a movement of a finger in one direction.

Further, the numerical value selecting device may also include a third acquisition unit. The third acquisition unit may be configured to acquire a number of consecutive occurrences of the third operational gesture. The control unit 200 may be connected to the third acquisition unit, and further configured to determine whether the number of consecutive occurrences of the third operational gesture exceeds a number threshold preset; and in response to the number of consecutive occurrences of the third operational gesture exceeding the number threshold, display a second operation prompt on the numerical value selecting interface, the second operation prompt being configured to notify the user that the scale unit is to be increased through the first operational gesture and/or decreased through the second operational gesture.

It should be understood that each unit described in the numerical value selecting device corresponds to each step of the method described in the above examples. Therefore, an operation and a feature described in relation to the method herein also apply to the numerical value selecting device and a unit therein, which will not be repeated here.

Please refer to FIG. 3 to FIG. 8. The present disclosure is elaborated with reference to a selection scene shown in FIG. 3 to FIG. 8, specifically as follows.

Display interfaces shown in FIG. 3 to FIG. 8 are some display interfaces of an exercise APP in a mobile terminal, and are a first interface to a sixth interface, in order.

Figure 3:
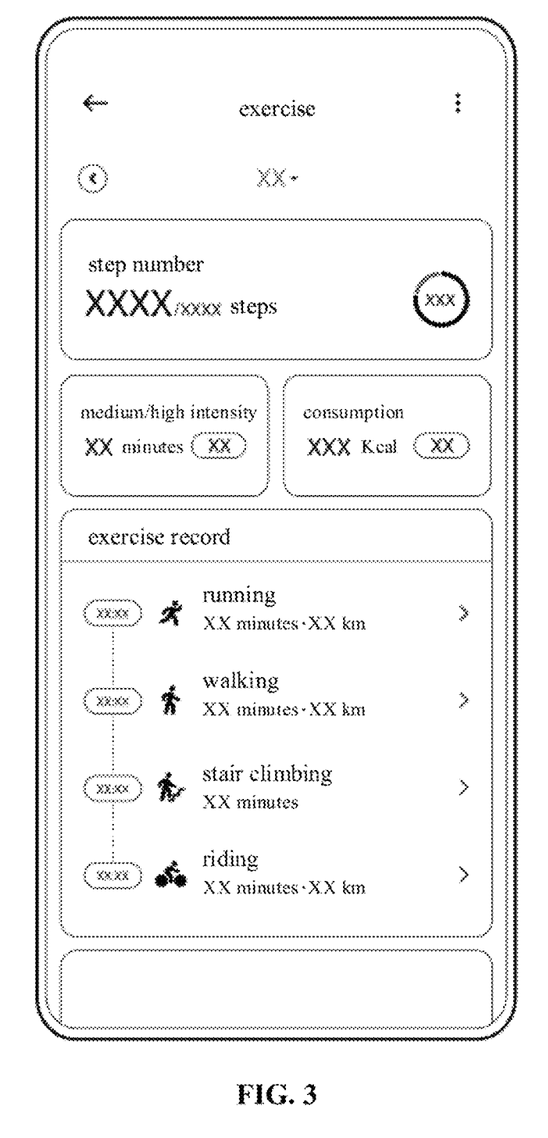
FIG. 3 is a diagram of a first interface according to an example of the present disclosure.

Referring to FIG. 3, the first interface displays content such as an exercise step number, exercise time, calorie consumption, and an exercise record of the user. A selection menu is provided at the top right corner. A click on the selection menu may allow entering the second interface.

Figure 4:
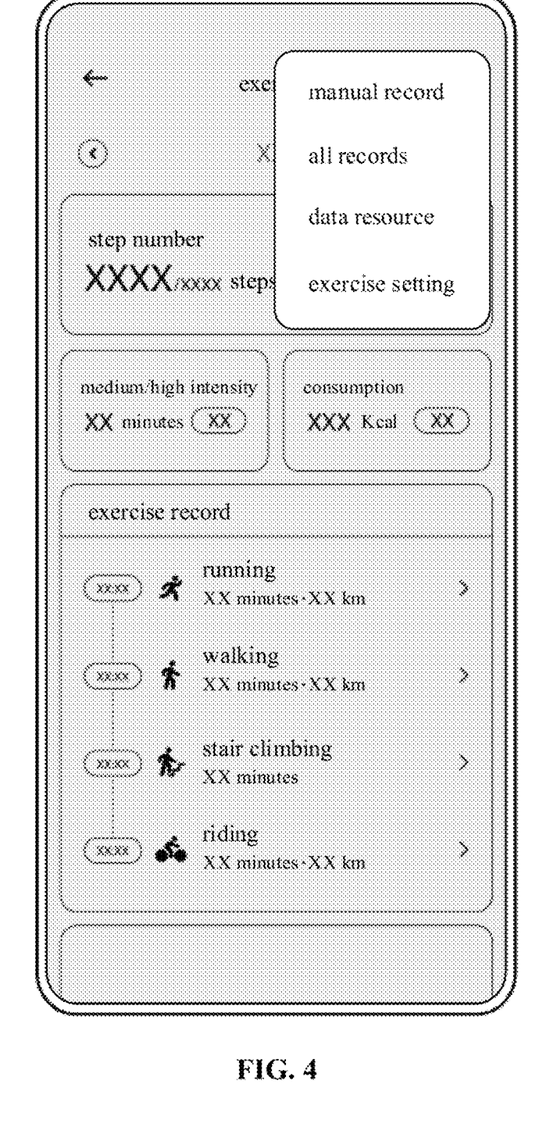
FIG. 4 is a diagram of a second interface according to an example of the present disclosure.
Figure 5:
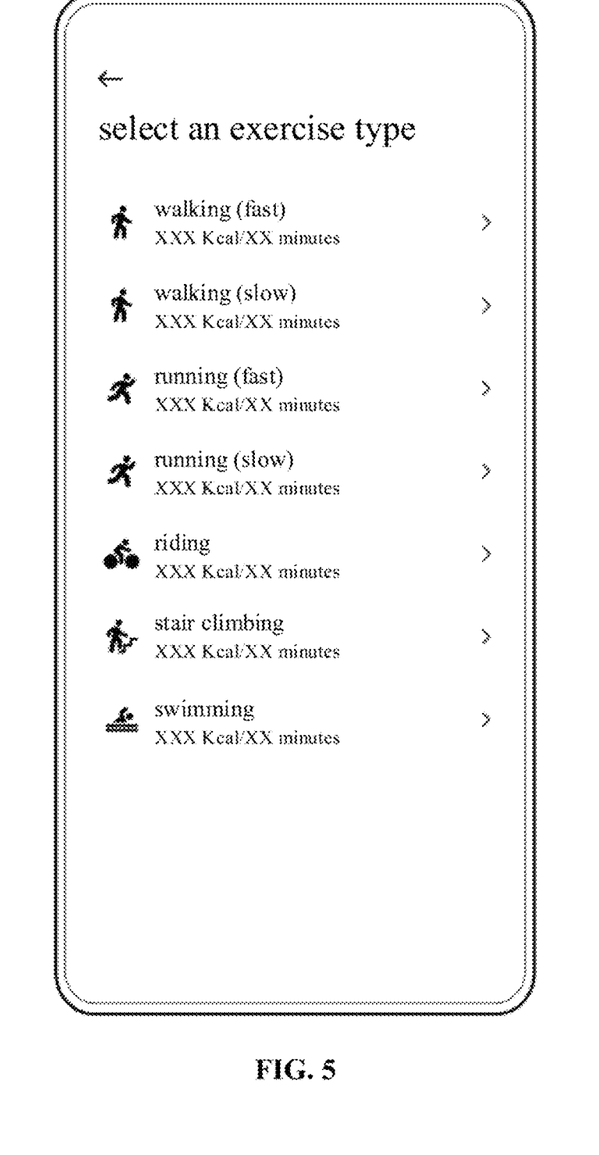
FIG. 5 is a diagram of a third interface according to an example of the present disclosure.

Referring to FIG. 4, the second interface provides a selection menu for the user. Content of the menu includes a manual record option. A click on the manual record option allows entering the third interface. The manual record option is configured for the user to record various parameters of the exercise. It should be understood that when the user starts the exercise APP, various parameters displayed in the first interface may be recorded automatically. If the user forgets to start the exercise APP, the user per se may perform recording through the manual record option.

Figure 6:
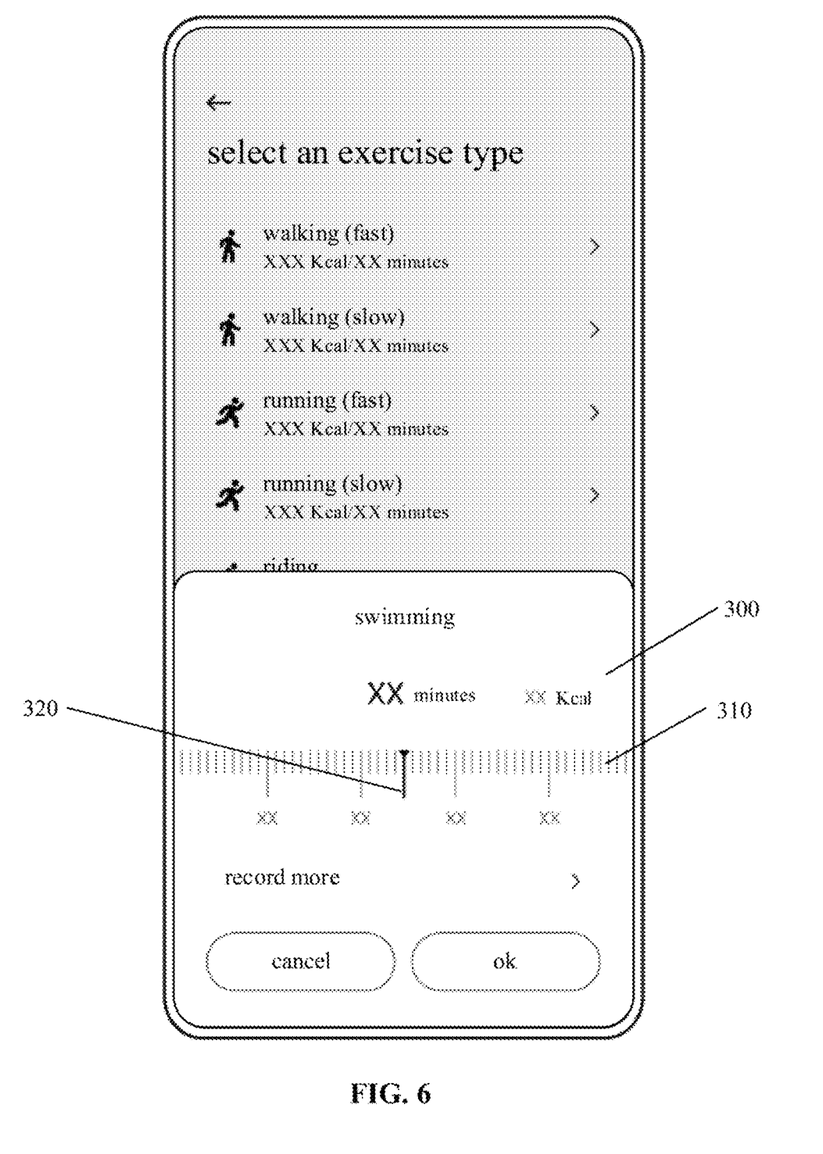
FIG. 6 is a diagram of a fourth interface according to an example of the present disclosure.

Referring to FIG. 5, the third interface displays various exercise options that may be recorded by the user per se, such as "walking (fast)", "running (fast)", "running (slow)", and "swimming", etc. A click on the "swimming" option allows entering the fourth interface.

Figure 7:
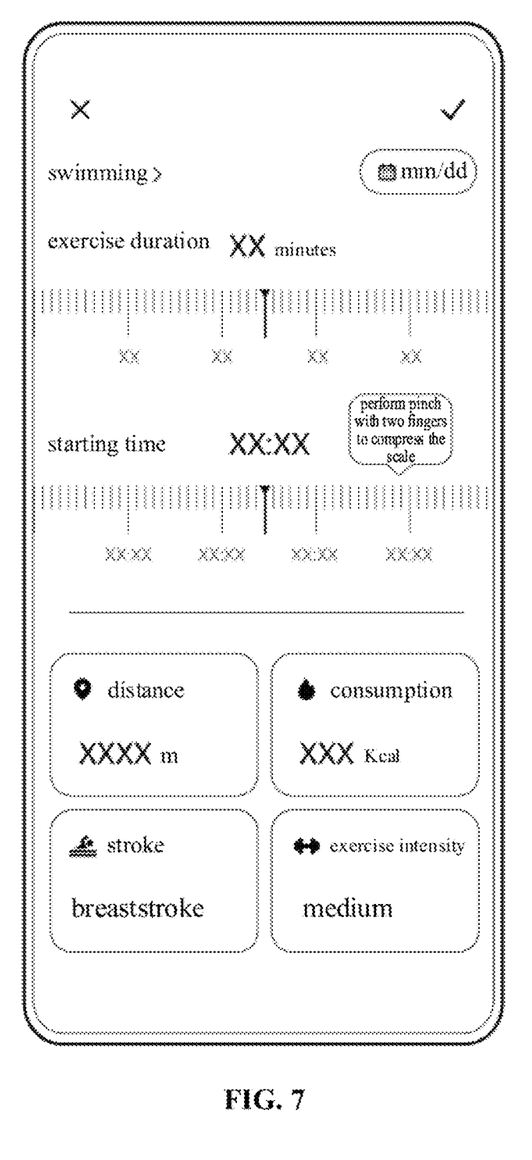
FIG. 7 is a diagram of a fifth interface according to an example of the present disclosure.

Referring to FIG. 6, the fourth interface displays a scale 310 for recording a swimming duration, and a corresponding pointer 320, as well as a "record more" option. The fourth interface is a numerical value selecting interface 300. The user may scale the scale unit by inputting the first operational gesture and the second operational gesture, and then to slide the scale 310 or the pointer 320 by inputting the third operational gesture to select the swimming duration. A click on the "record more" option may allow entering the fifth interface.

Increasing (or decreasing) the scale unit of the numerical scale 310 may mean that a unit distance represented by spacing between two neighbouring marks of the scale 310 is increased, such as from 1 m to 5 m (or decreased from 5 m to 1 m).

There may be two ways to have the pointer 320 point to a specific value. One is to move the pointer 320 to point to the specific value on the scale 310. The other is to keep the pointer 320 still, and slide the scale 310 left and right to align the specific value on the scale 310 to the pointer 320. The scale 310 may actually be quite long, and only the part of the scale displayed on the screen of the mobile phone in FIG. 6 is visible to the user, which may be slid left and right to show the hidden part of the scale.

Figure 8:
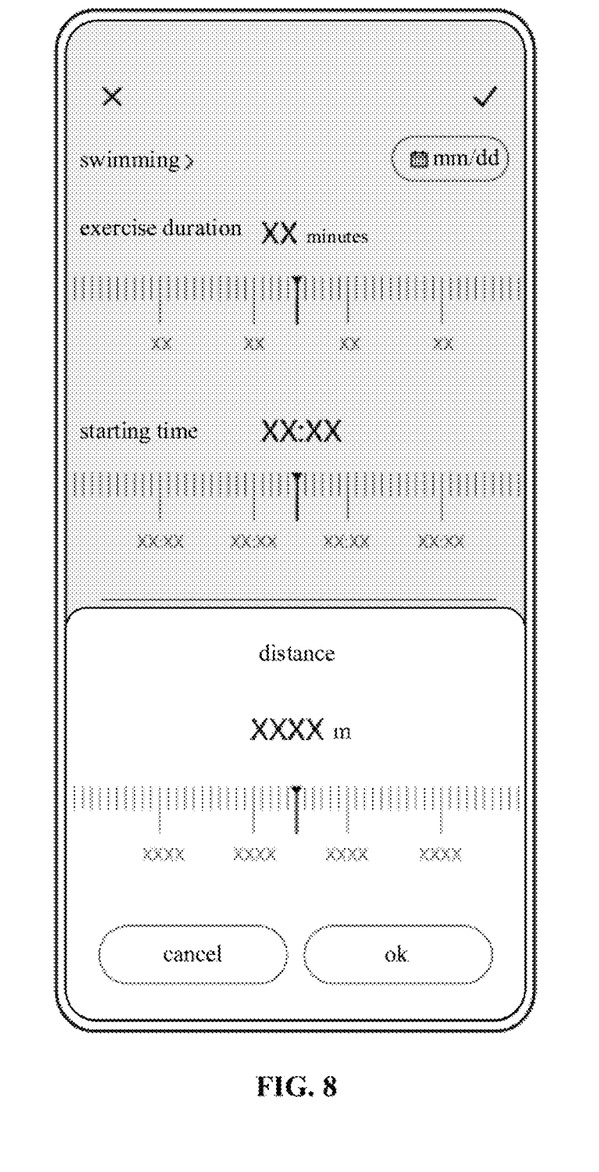
FIG. 8 is a diagram of a sixth interface according to an example of the present disclosure.

Referring to FIG. 7, the fifth interface displays options such as "exercise duration", "starting time", "distance", "calorie consumption", etc. The fifth interface is a numerical value selecting interface 300. Specifically, numerical values may be selected for the exercise duration and the starting time through the corresponding scale 310 and pointer 320. Taking the "starting time" option as an example, the user may scale the scale unit by inputting the first operational gesture and the second operational gesture, and then slide the scale 310 or the pointer 320 by inputting the third operational gesture to select a time value for the starting time. A click on the "distance" option may allow entering the sixth interface.

Referring to FIG. 8, the sixth interface displays the scale 310 for recording the swimming distance and the corresponding pointer 320. The sixth interface is a numerical value selecting interface 300. The user may scale the scale unit by inputting the first operational gesture and the second operational gesture, and then slide the scale 310 or the pointer 320 by inputting the third operational gesture to select a value for the swimming distance.

Figure 9:
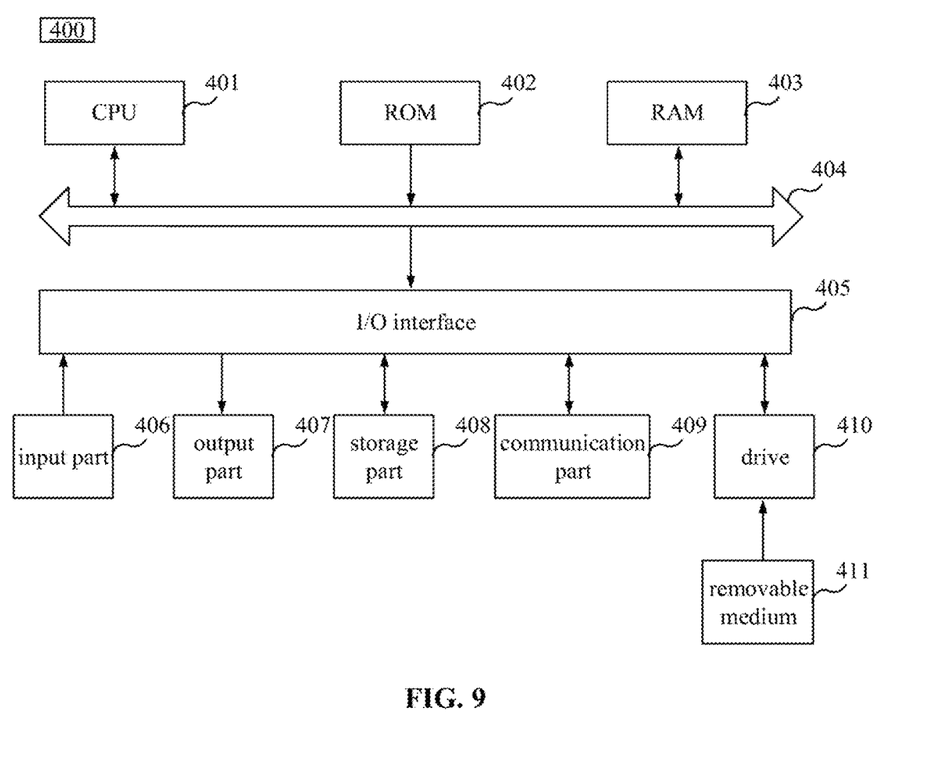
FIG. 9 is a diagram of a structure of computer equipment according to an example of the present disclosure.

FIG. 9 is a diagram of a structure of computer equipment according to an example of the present disclosure. As shown in FIG. 9, the computer equipment 400 includes a Central Processing Unit (CPU) 401, which may execute various proper actions and processing according to a program stored in a Read-Only Memory (ROM) 402 or a program loaded from a storage part to a Random Access Memory (RAM) 403. Various programs and data required for system operation are further stored in the RAM 403. The CPU 401, the ROM 402, and the RAM 403 are connected to one another through a bus 403. An Input/Output (I/O) interface 405 is also connected to the bus 403.

Components connected to the I/O interface 405 include: an input part 406 including a keyboard, a mouse, etc.; an output part 407 including a Cathode Ray Tube (CRT), a Liquid Crystal Display (LCD), a speaker, etc.; the storage part 408 including a hard disk, etc.; and a communication part 409 of a network interface card including a Local Area Network (LAN) card, a modem, etc. The communication part 409 performs communication processing through a network such as the Internet. A drive is also connected to the I/O interface 405 as needed. A removable medium 411, such as a magnetic disk, an optical disk, a magneto-optical disk, a semiconductor memory, etc., is installed on the drive 410 as needed, such that a computer program read therefrom is installed in the storage part 408 as needed.

Particularly, according to examples of the present disclosure, the process described above with reference to flowchart 1 may be implemented as a computer software program. For example, examples of the present disclosure may include a computer program product, which may include a computer program borne on a computer-readable medium. The computer program includes a program code for executing a control method in the above examples. In such an example, the computer program may be downloaded from a network through the communication part and installed, and/or installed from the removable medium. When executed by the CPU 401, the computer program executes the above functions defined in the system of the present disclosure.

It is to be noted that the computer-readable medium shown in the present disclosure may be a computer-readable signal medium or a computer-readable storage medium or any combination of the two. A computer-readable storage medium may exemplarily be, but not limited to, an electronic, magnetic, optical, electromagnetic, infrared, or semiconductor system, device, or any combination thereof. A more specific example of the computer-readable storage medium may include but is not limited to: an electrical connection having one or more wires, a portable computer disk, a hard disk, a RAM, a ROM, an Erasable Programmable ROM (EPROM or a flash memory), an optical fiber, a portable Compact Disc Read-Only Memory (CD-ROM), an optical storage device, a magnetic storage device, or any appropriate combination thereof. In the present disclosure, the computer-readable storage medium may be any tangible medium including or storing a program. The program may be used by, or used together with, an instruction executing system or device. In the present disclosure, the computer-readable signal medium may be included in a baseband or serve as a data signal propagated as part of a carrier, and it bears a computer-readable program code therein. Such a propagated data signal may take on many forms, including, but not limited to, an electromagnetic signal, an optical signal, or any suitable combination thereof. The computer-readable signal medium may further be any computer-readable medium other than the computer-readable storage medium, that may send, propagate, or transmit a program for being used by, or used together with, an instruction execution system or device. A program code included in the computer-readable medium may be transmitted using any suitable medium, including, but not limited to, radio, electric wire, optical cable, Radio Frequency (RF), etc., or any suitable combination thereof.

The flowcharts and block diagrams in the drawings illustrate possible implementations of architecture, functionality, and operation of the system, method, and computer program product according to examples of the present disclosure. In this regard, each block in the flowcharts or block diagrams may represent a module, a program segment, or a part of a code that includes one or more executable instructions for implementing a specified logic function. It should also be noted that, in some alternative implementations, functions noted in blocks may also occur in an order other than that noted in the drawings. For example, two consecutively shown blocks may in fact be performed substantially in parallel, or sometimes performed in a reverse order, depending upon functionality involved. It will also be noted that, each block in the block diagrams or the flowcharts, and combination of blocks in the block diagrams or the flowcharts, may be implemented using a special purpose hardware-based system for executing a specified function or operation, or using a combination of a special purpose hardware and computer instructions.

A unit described in examples of the present disclosure may be implemented as software or hardware. The described unit may also be provided in a processor. The name of such a unit does not form any limit to the unit per se in some cases. The described unit or module may also be provided in a processor, which may be described for example as: a processor including a control unit, etc. The name of such a unit or module does not form any limit to the unit or module per se in some cases. For example, a control unit may further be described as "a unit configured to determine whether an operational gesture is a first operational gesture or a second operational gesture preset; increase a scale unit of a numerical scale 310 when the operational gesture is the first operational gesture, and decrease the scale unit of the numerical scale 310 when the operational gesture is the second operational gesture".

As another aspect, the present disclosure further provides a computer-readable medium. The computer-readable medium may be included in the terminal equipment described in the above examples, and may also exist by itself, without being assembled into the terminal equipment. The computer-readable medium bears one or more programs. When the one or more programs are executed by the terminal equipment, the terminal equipment implements the numerical value selecting method according to the above examples.

For example, the terminal equipment may implement the numerical value selecting method shown in FIG. 1, where in S100, an operational gesture input by a user is acquired; and in S200, it is identified whether the operational gesture is a first operational gesture or a second operational gesture preset. When the operational gesture is the first operational gesture, a scale unit of the numerical scale 310 is increased.

When the operational gesture is the second operational gesture, the scale unit of the numerical scale 310 is decreased.

It should be noted that although a number of modules or units of the equipment for executing actions are mentioned in the above detailed description, such a division is not mandatory. As a matter of fact, according to implementation of the present disclosure, features and functions of two or more modules or units described above may be concretized in one module or unit. On the contrary, the feature and function of one module or unit described above may further be divided to be concretized by multiple modules or units.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

In addition, although in the drawings, steps of the method of the present disclosure are described in a specific order, it is not required or suggested that the steps must be executed in the specific order, or that all the steps shown must be executed to achieve the desired result. Additionally or alternatively, some steps may be omitted, multiple steps may be combined into one step for execution, and/or one step may be decomposed into multiple steps for execution, etc.

With description of the above implementation, it is easily understood by a skilled person in the art that the exemplary implementation described here may be implemented by software, and may also be implemented by software combined with necessary hardware.

It is to be understood that the terms "first" and "second" are merely for purpose of illustration, and cannot be construed as indicating or implying a relative importance or implying a number of technical features indicated. Therefore, a feature defined by "first" or "second" may include one or more of the feature explicitly or implicitly. In description of the present disclosure, unless stated otherwise, "multiple" means two or more.

Foregoing are only examples of the present disclosure and description of a technical principle applied. It should be appreciated by a skilled person in the art that the inventive scope of the present disclosure is not limited to a technical solution formed by a specific combination of the above technical features, but should also cover other technical solutions formed by any combination of the above technical features or equivalent features thereof without departing from the concept of the present disclosure, such as a technical solution formed by swapping the features and technical features with similar functions disclosed in the present disclosure (but not limited thereto).

What is claimed is:

1. A numerical value selecting method, for selecting a numerical value on a numerical value selecting interface having a numerical scale, comprising:
    acquiring an operational gesture input by a user;
    identifying whether the operational gesture is a preset first operational gesture or a preset second operational gesture;
    in response to the operational gesture being the first operational gesture, increasing a scale unit of the numerical scale;
    in response to the operational gesture being the second operational gesture, decreasing the scale unit of the numerical scale, wherein the first operational gesture is either a movement of two fingers moving toward each other or a movement of the two fingers moving away from each other, wherein the second operational gesture is either the movement of the two fingers moving toward each other or the movement of the two fingers moving away from each other, and the second operational gesture is distinct from the first operational gesture, and wherein the numerical value selecting interface further comprises a pointer used together with the numerical scale;
    identifying whether the operational gesture is a preset third operational gesture, the third operational gesture comprising a movement of a finger in one direction;
    in response to the operational gesture being the third operational gesture, controlling the scale unit or the pointer to move along the one direction in which the finger moves in the third operational gesture;
    acquiring a number of consecutive occurrences of the third operational gesture;
    determining whether the number of consecutive occurrences of the third operational gesture exceeds a preset threshold; and
    in response to the number of consecutive occurrences of the third operational gesture exceeding the threshold, displaying a second operation prompt on the numerical value selecting interface, the second operation prompt being configured to notify the user that the scale unit is to be increased through the first operational gesture and/or decreased through the second operational gesture;
    wherein the number of consecutive occurrences of the third operational gesture is acquired as N times if an interval between any two consecutive third operational gestures of N third operational gestures input by the user is not greater than a preset inertial run time, N being a positive integer greater than or equal to 2, and the preset inertial run time being a difference between a movement time of the third operational gesture and a movement time of the scale unit or the pointer.

2. The numerical value selecting method of claim 1, further comprising:
    in response to identifying the first operational gesture, determining whether a present scale unit reaches an increase threshold preset; in response to the present scale unit reaching the increase threshold, keeping the present scale unit unchanged; otherwise, in response to the present scale unit not reaching the increase threshold, increasing the present scale unit; and/or
    in response to identifying the second operational gesture, determining whether a present scale unit reaches a decrease threshold preset; in response to the present scale unit reaching the decrease threshold, keeping the present scale unit unchanged; otherwise, in response to the present scale unit not reaching the decrease threshold, decreasing the present scale unit.

3. The numerical value selecting method of claim 1, further comprising:
    determining whether the numerical value selecting interface is accessed for a first time; in response to the numerical value selecting interface being accessed for the first time, displaying a first operation prompt on the numerical value selecting interface, the first operation prompt being configured to notify the user that the scale unit is to be increased through the first operational gesture and/or decreased through the second operational gesture.

4. The numerical value selecting method of claim 1, further comprising:
    in response to identifying the first operational gesture, acquiring a first amount of movement between the two fingers, and controlling an increase ratio for increasing the scale unit according to an increase rule preset and the first amount of movement; and/or
    in response to identifying the second operational gesture, acquiring a second amount of movement between the two fingers, and controlling a decrease ratio for decreasing the scale unit according to a decrease rule preset and the second amount of movement.

5. The numerical value selecting method of claim 4, wherein the increase rule is a positive correlation between the first amount of movement and the increase ratio, and/or the decrease rule is a positive correlation between the second amount of movement and the decrease ratio.

6. The numerical value selecting method of claim 1, wherein an increase ratio for each increase of the scale unit is identical, and/or a decrease ratio for each decrease of the scale unit is identical.

7. Terminal equipment, comprising a memory, a processor, and a computer program stored on the memory and executable on the processor, wherein when executing the program, the processor implements a numerical value selecting method, for selecting a numerical value on a numerical value selecting interface having a numerical scale to perform:
    acquiring an operational gesture input by a user;
    identifying whether the operational gesture is a preset first operational gesture or a preset second operational gesture;
    in response to the operational gesture being the first operational gesture, increasing a scale unit of the numerical scale; and
    in response to the operational gesture being the second operational gesture, decreasing the scale unit of the numerical scale, wherein the first operational gesture is either a movement of two fingers moving toward each other or a movement of the two fingers moving away from each other, wherein the second operational gesture is either the movement of the two fingers moving toward each other or the movement of the two fingers moving away from each other, and the second operational gesture is distinct from the first operational gesture, and wherein the numerical value selecting interface further comprises a pointer used together with the numerical scale;
    identifying whether the operational gesture is a preset third operational gesture, the third operational gesture comprising a movement of a finger in one direction;
    in response to the operational gesture being the third operational gesture, controlling the scale unit or the pointer to move along the one direction in which the finger moves in the third operational gesture;
    acquiring a number of consecutive occurrences of the third operational gesture;
    determining whether the number of consecutive occurrences of the third operational gesture exceeds a preset threshold; and
    in response to the number of consecutive occurrences of the third operational gesture exceeding the threshold, displaying a second operation prompt on the numerical value selecting interface, the second operation prompt being configured to notify the user that the scale unit is to be increased through the first operational gesture and/or decreased through the second operational gesture;
    wherein the number of consecutive occurrences of the third operational gesture is acquired as N times if an interval between any two consecutive third operational gestures of N third operational gestures input by the user is not greater than a preset inertial run time, N being a positive integer greater than or equal to 2, and the preset inertial run time being a difference between a movement time of the third operational gesture and a movement time of the scale unit or the pointer.

8. The terminal equipment of claim 7, wherein the processor further implements to perform:
    in response to identifying the first operational gesture, determining whether a present scale unit reaches an increase threshold preset; in response to the present scale unit reaching the increase threshold, keeping the present scale unit unchanged; otherwise, in response to the present scale unit not reaching the increase threshold, increasing the present scale unit; and/or
    in response to identifying the second operational gesture, determining whether a present scale unit reaches a decrease threshold preset; in response to the present scale unit reaching the decrease threshold, keeping the present scale unit unchanged; otherwise, in response to the present scale unit not reaching the decrease threshold, decreasing the present scale unit.

9. The terminal equipment of claim 7, wherein the processor further implements to perform:
    determining whether the numerical value selecting interface is accessed for a first time; in response to the numerical value selecting interface being accessed for the first time, displaying a first operation prompt on the numerical value selecting interface, the first operation prompt being configured to notify the user that the scale unit is to be increased through the first operational gesture and/or decreased through the second operational gesture.

10. A non-transitory computer-readable storage medium, having stored thereon a computer program which, when executed by a processor, implements a numerical value selecting method, for selecting a numerical value on a numerical value selecting interface having a numerical scale, wherein the method comprises:
    acquiring an operational gesture input by a user;
    identifying whether the operational gesture is a preset first operational gesture or a preset second operational gesture;
    in response to the operational gesture being the first operational gesture, increasing a scale unit of the numerical scale; and
    in response to the operational gesture being the second operational gesture, decreasing the scale unit of the numerical scale, wherein the first operational gesture is either a movement of two fingers moving toward each other or a movement of the two fingers moving away from each other, wherein the second operational gesture is either the movement of the two fingers moving toward each other or the movement of the two fingers moving away from each other, and the second operational gesture is distinct from the first operational gesture, and wherein the numerical value selecting interface further comprises a pointer used together with the numerical scale;

identifying whether the operational gesture is a preset third operational gesture, the third operational gesture comprising a movement of a finger in one direction;

in response to the operational gesture being the third operational gesture, controlling the scale unit or the pointer to move along the one direction in which the finger moves in the third operational gesture;

acquiring a number of consecutive occurrences of the third operational gesture;

determining whether the number of consecutive occurrences of the third operational gesture exceeds a preset threshold; and in response to the number of consecutive occurrences of the third operational gesture exceeding the threshold, displaying a second operation prompt on the numerical value selecting interface, the second operation prompt being configured to notify the user that the scale unit is to be increased through the first operational gesture and/or decreased through the second operational gesture;

wherein the number of consecutive occurrences of the third operational gesture is acquired as N times if an interval between any two consecutive third operational gestures of N third operational gestures input by the user is not greater than a preset inertial run time, N being a positive integer greater than or equal to 2, and the preset inertial run time being a difference between a movement time of the third operational gesture and a movement time of the scale unit or the pointer.

* * * * *